(12) United States Patent
Nielsen

(10) Patent No.: US 7,441,852 B2
(45) Date of Patent: Oct. 28, 2008

(54) PRINTER

(75) Inventor: Jeffrey A. Nielsen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 11/192,554

(22) Filed: Jul. 28, 2005

(65) Prior Publication Data

US 2007/0024876 A1    Feb. 1, 2007

(51) Int. Cl.
  *B41J 29/38* (2006.01)
(52) U.S. Cl. ............................................. 347/14; 347/7
(58) Field of Classification Search .................. 347/7, 347/14
  See application file for complete search history.

(56) References Cited

U.S. PATENT DOCUMENTS

2007/0019011 A1*  1/2007  Sugimoto ...................... 347/7
2008/0174623 A1*  7/2008  Sudo et al. ................... 347/14
2008/0174624 A1*  7/2008  Sudo et al. ................... 347/14

* cited by examiner

*Primary Examiner*—Thinh H Nguyen
(74) *Attorney, Agent, or Firm*—Matthew L. Wade

(57) ABSTRACT

A printer that includes a multi-colorant print cartridge is described. The printer can determine if a level of a most depleted colorant in the multi-colorant cartridge and a level of a least depleted colorant in the multi-colorant cartridge meet predetermined criteria. The printer can, if the criteria are met, perform a default printing procedure to print the document. The printer can, if the criteria are not met, perform an alternative printing procedure to print the document. The alternative printing procedure uses more of the least depleted colorant to print the document as compared to the default printing procedure.

29 Claims, 6 Drawing Sheets

PRINTER

BACKGROUND

As used herein, the phrase "printer" refers to any device that includes a printing function. Thus, for example, the phrase "printer" may refer to an inkjet printer, a laser printer, a commercial printing press, a multifunction peripheral (MFP) that includes a printing function, etc. The term "colorant" refers to a printer material, such as toner or ink, that is used in a printer to print an image.

A number of printers obtain colorants from installed print cartridges that have a life cycle during which the print cartridge is functional. When the functional life cycle ends, the print cartridge is replaced with a new cartridge. Examples of replaceable cartridges for printing devices include ink cartridges and toner cartridges.

Replacing a print cartridge in a printing device typically involves costs and user involvement. It is desirable, therefore, to find ways that can extend the functional life cycle of a print cartridge.

DESCRIPTION

For the following discussion, it is noted that some replaceable print cartridges combine colorants of different colors (e.g., CMY) into a single replaceable print cartridge. For ease of discussion, a print cartridge that combines multiple colorants (i.e., toner or ink) of different colors may be referred to herein as a "multi-colorant" cartridge. A print cartridge that includes only a single colorant may be referred to as a "single-colorant" cartridge.

A multi-colorant cartridge installed in a prior art printer typically needs replacement when the first reservoir of colorant is depleted. This is regardless of whether the multi-colorant cartridge still includes reservoirs of other colorants that are not depleted. In this type of situation, the multi-colorant cartridge is replaced and the colorants in the expired cartridge that are not depleted are wasted.

The printer described below employs printing methods that provide for a more balanced usage of the colorants contained in a multi-colorant print cartridge. As a result, the overall amount of colorant that remains in the cartridge at the end of its useful life is reduced. Further, print cartridge life can be extended.

Figure 1:
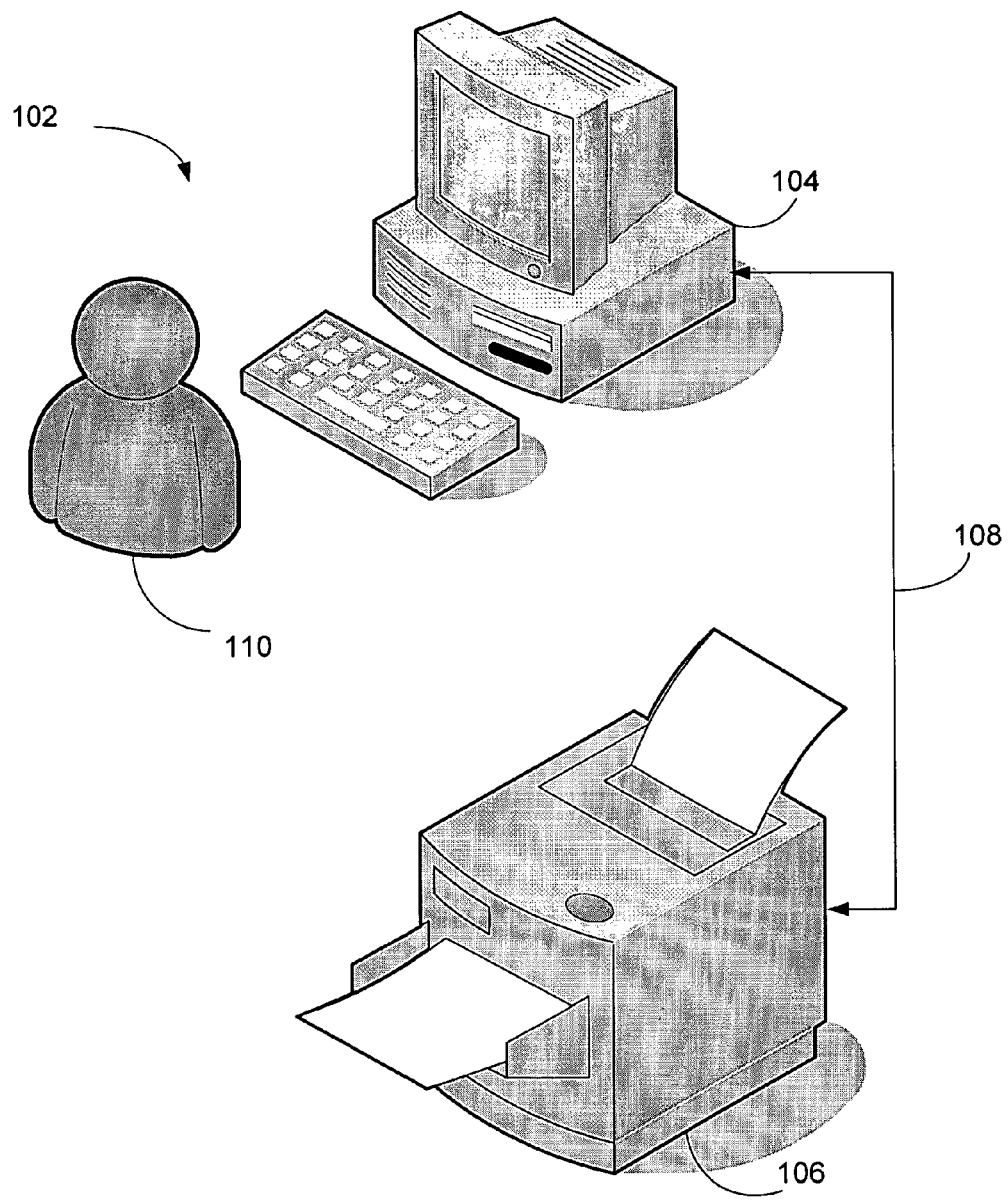
FIG. 1 depicts a computing system that incorporates one embodiment of the invention.

FIG. 1 depicts a computing system 102 that incorporates one embodiment (among others) of the invention. In this example, the computing system 102 includes a host computer 104 connected to a printer 106 over a communication link 108.

The communication link 108 may represent any suitable communication resource that allows the host computer 104 (and perhaps other host computers not shown) to electronically transmit a print job to the printer 106. Thus, the communication link 108 may include a wired connection or wireless connection or some combination thereof. In some implementations, the communication link 108 may represent a network that allows multiple users to use the printer 106.

In this example embodiment, we will assume the printer 106 is capable of printing various types of documents. For example, a remote user 110 may operate the host computer 102 to submit a print job (that describes a document to be printed) to the printer 106. The printer 106 is responsive to the print job by printing the document.

A walk-up user to the printer 106 may also request certain documents to be printed by the printer 106. For example, a walk-up user may interact with a local control panel of the printer 106 so as to cause the printer to print a photo proof sheet, for example. Specific and non-limiting examples of how the printer 106 may be constructed to enable printing of a photo proof sheet is described in U.S. Pat. No. 6,744,529. The disclosure of that patent is incorporated herein by reference.

Figure 2:
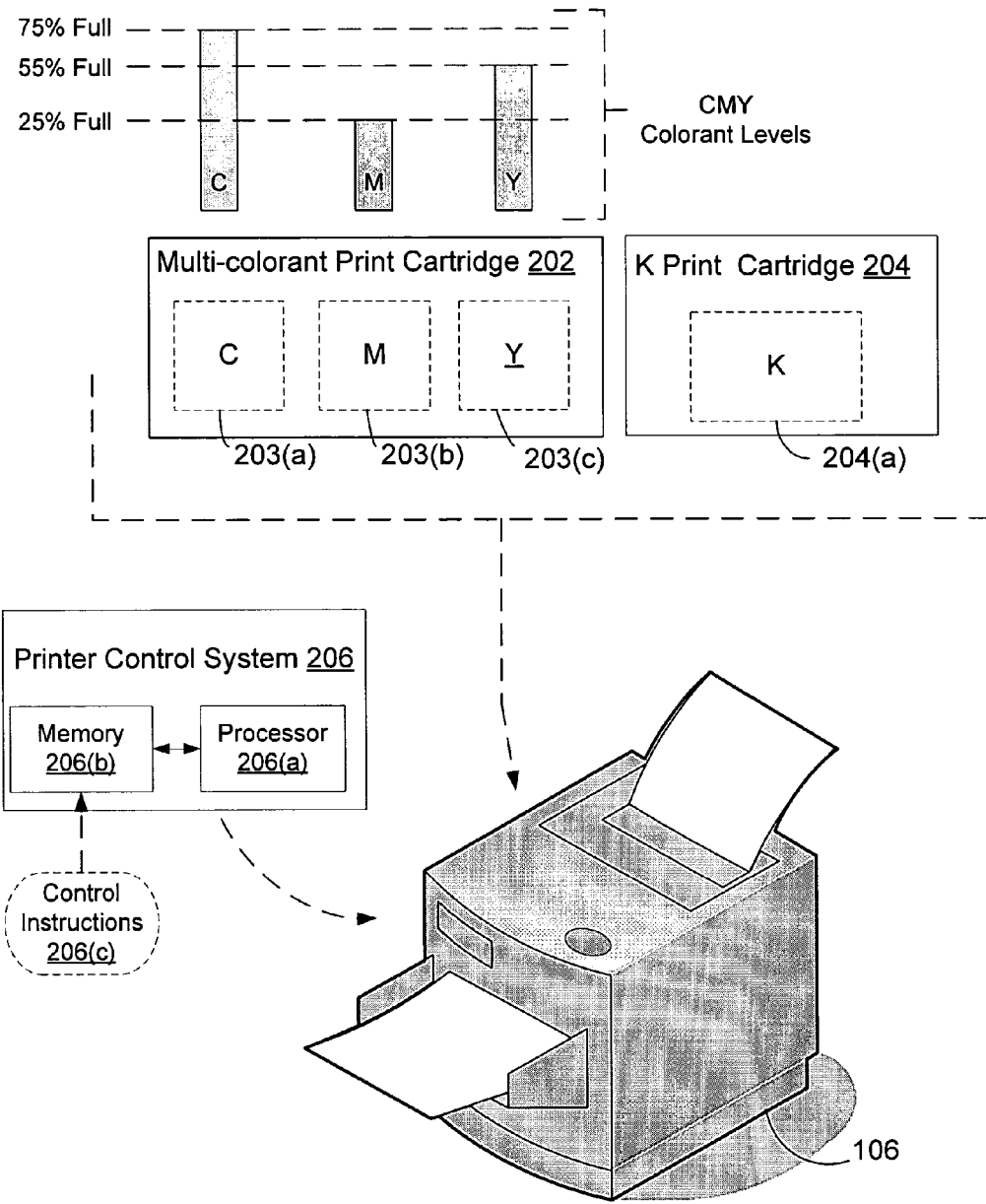
FIG. 2 illustrates a printer that incorporates one embodiment of the invention.

FIG. 2 illustrates certain aspects of the printer 106. In this example, we assume the printer 106 is configured with a replaceable multi-colorant print cartridge 202 and a replaceable single-colorant print cartridge 204. Each of the two print cartridges generally provides the printer 106 with a reservoir of colorants (e.g., toner or ink) that can be used during the printing process to print color documents on media.

The multi-colorant print cartridge 202 provides the printer 106 with a reservoir of Cyan (C) colorant 203(a), a reservoir of Magenta (M) colorant 203(b) and a reservoir of Yellow (Y) colorant 203(c). We will assume in this example that the CMY reservoirs 203 hold equal quantities of colorant. The single-colorant print cartridge 204 includes a reservoir of black (K) colorant 204(a).

FIG. 2 also illustrates, schematically, the present level of the CMY colorant reservoirs according to one possible CMY colorant usage scenario. As shown, in this example, the reservoir of C-colorant 203(a) is 75% full, the reservoir of M-colorant 203(b) is 25% full and the reservoir of Y-colorant is 55% full. Thus, in this example, the C-colorant 203(a) is the least depleted CMY colorant. The M-colorant 203(b) is the most depleted CMY colorant. It is noted that if this particular CMY colorant usage pattern continues, the M-colorant 203(b) will be the first of the CMY colorants that is completely depleted.

Also illustrated in FIG. 2 is the printer control system 206. The printer control system 206 generally controls the operation of the printer 106 to print documents. As shown, the control system 206 includes a processor 206(a) and a memory 206(b) that stores a set of control instructions 206(c). The set of control instructions 206(c) are executable by the processor 206(b) to perform the printing procedures described below.

It is further noted for the later discussion that the printer is able to determine the current level of each of the CMYK colorant reservoirs at any point of time. To enable this capability, for example, the printer may employ a standard ink drop counting system and/or sensors that can sense the present level of each colorant reservoir.

Figure 3:
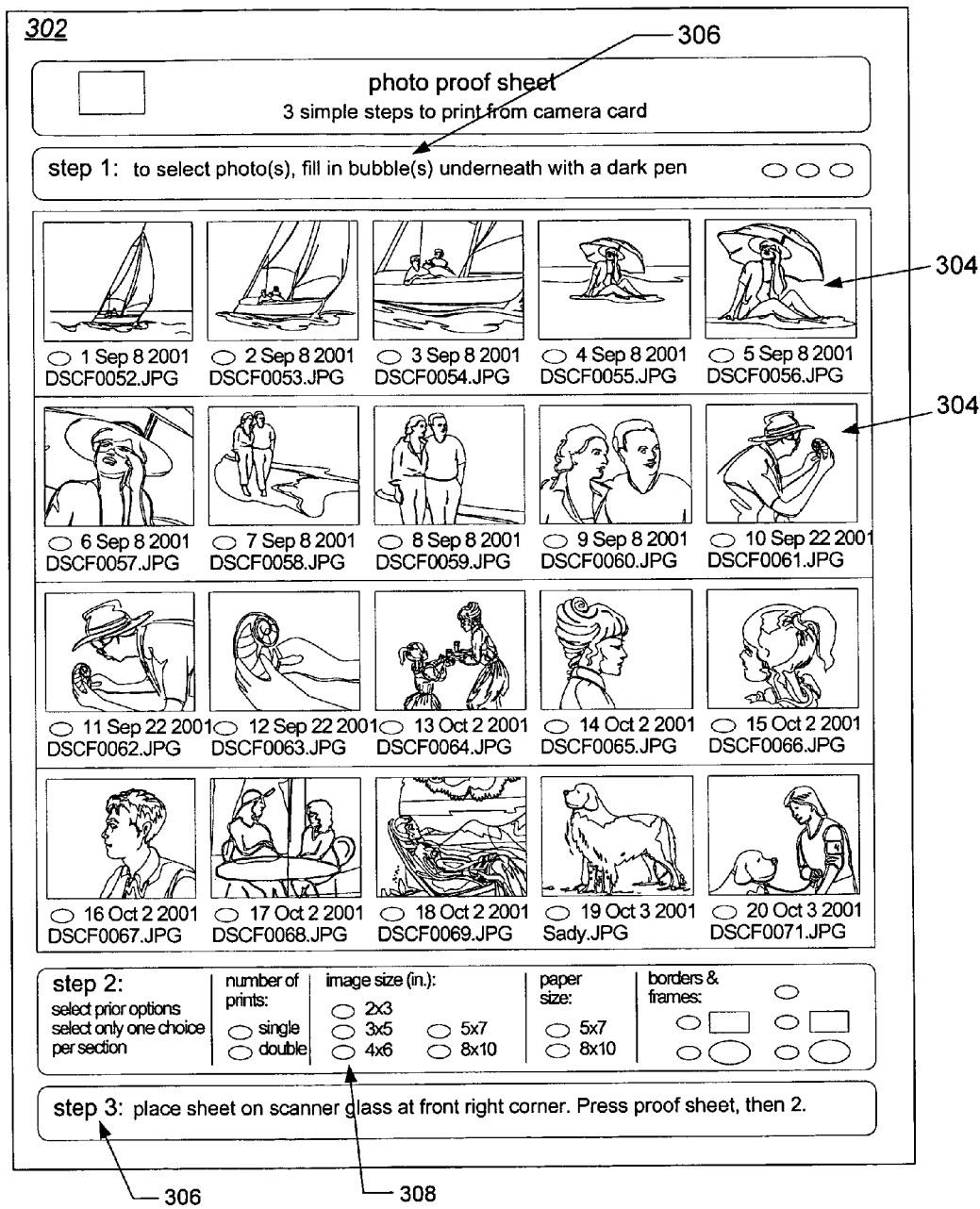
FIG. 3 illustrates one example of a photo proof sheet.

FIG. 3 illustrates one example of a photo proof sheet 302 that may be printed by the printer 106 at the request of a walk-up user. As shown, the photo proof sheet 302 includes various thumbnail images 304 each representing, for example, a digital photo that the user may wish to print. The thumbnail images 304 are typically printed in color on the proof sheet.

The photo proof sheet 302 further includes various user instructions 306 as well as user designation bubbles 308 that are to be manually filled in by a user using a marking implement, such as a pen or pencil, for example.

Printer Operation to Print Photo Proof Sheet

For the discussion that follows, it is noted that the printer 106 may optionally print a photo proof sheet using either a default printing procedure or by using an alternative printing procedure. As described further below, the default printing procedure accurately reproduces the colors of a photo proof sheet to the best of the printer abilities.

The alternative printing procedure, on the other hand, can operate to substitute the least depleted CMY colorant for a "default colorant" in order to print certain pre-selected image elements of the photo proof sheet. Wherein, the phrase "default colorant", refers to a colorant that would have been used by the default printing procedure to print the same image elements.

Thus, for example, assume the default printing procedure would print the pre-selected image elements using black colorant that is obtained from the K-cartridge 204. As described below, under certain conditions, the alternative printing procedure will instead operate to substitute the least depleted CMY colorant for the black colorant when printing these same image elements. In this example, therefore, the black colorant is the "default colorant".

Figure 4:
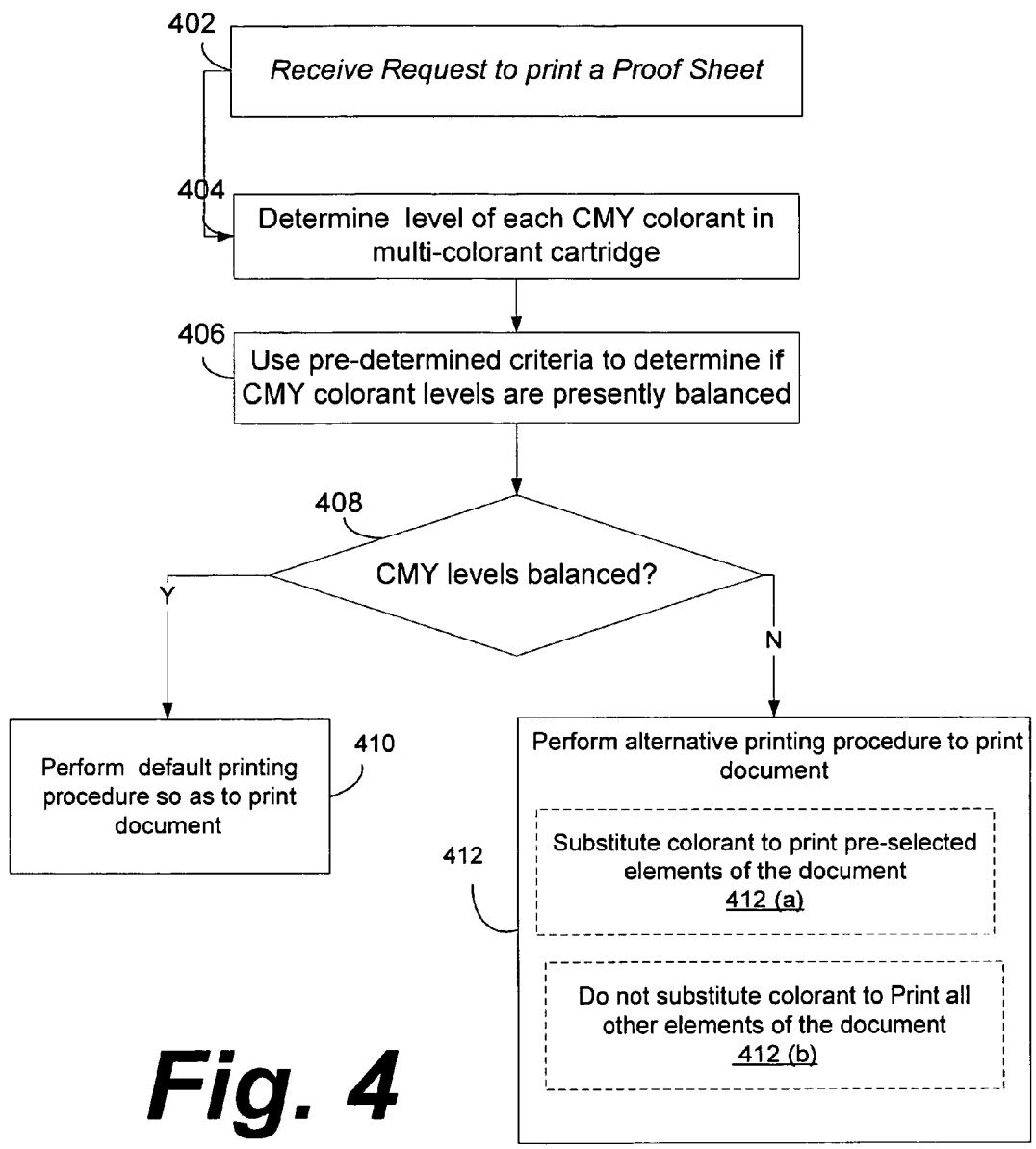
FIG. 4 is a flow diagram illustrating how a printer may operate to print a document (e.g., a photo proof sheet) according to one embodiment of the invention.

With reference to FIG. 4, shown is a flow diagram that illustrates an example of how the printer 106 may operate to print a photo proof sheet. At step 402, the printer 106 receives a user request (from a walk-up user) to print a photo proof sheet. The user request may be received by the printer via a local control panel, for example.

At step 404, the printer operates to determine the present level of each one of the CMY colorants 203 in the multi-colorant cartridge 202.

At step 406, the printer analyzes the CMY colorant levels and uses pre-determined criteria to determine if the CMY colorant levels are presently balanced. According to one implementation, the printer determines that the CMY colorants are balanced only if the following relationship is true:

(Least depleted CMY Colorant level−Most depleted CMY Colorant level)<(Threshold Value)

It is worthwhile to note that the CMY colorants may all be over 50% of full capacity, for example, and the printer may still determine that the CMY colorants are not balanced.

If the printer determines that the CMY colorant levels are balanced, then the printer proceeds to respond to the user request by printing the photo proof sheet in a normal manner (i.e., by performing a default printing procedure to print the photo proof sheet) (step 408, 410). As a result, the colors of all image elements of the proof sheet are accurately reproduced to the best of the printer abilities.

If, however, the printer determines that the CMY colorant levels are not balanced, then the printer proceeds to respond to the user request by printing the photo proof sheet according to the alternative printing procedure (step 408, 412). The alternative printing procedure operates to substitute the least depleted CMY colorant (and under some circumstances, the second to least depleted CMY colorant) for a default colorant when printing pre-selected elements of the proof sheet (substep 412(a)). The rest of the proof sheet, however, is printed using the same colorants that would have been used in the default printing procedure (substep 412(b)).

EXAMPLE

Figure 5:
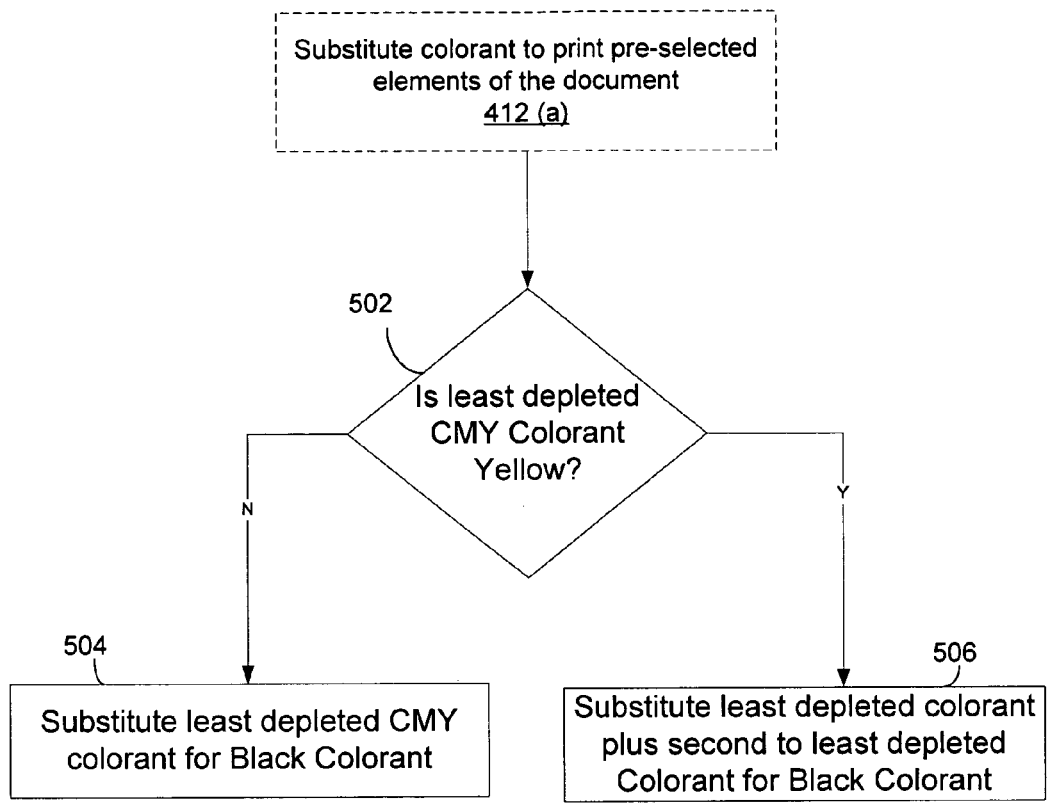
FIG. 5 is a flow diagram illustrating the logic of an alternative printing procedure according to one embodiment of the invention.

FIG. 5 illustrates an example of how the alternative printing procedure may operate to print the "pre-selected image elements" of the photo proof sheet assuming the following:

1. The pre-selected image elements correspond to the proof sheet user instructions and the user designation areas;

2. The default printing procedure would print the proof sheet user instructions/designation areas using only the black colorant that is obtained from the K-print Cartridge 204(a). Thus, in this example, the default colorant is the black colorant.

Under this scenario, the alternative printing procedure may first determine if the least depleted CMY colorant is yellow (decision step 502). If this is not the case, the alternative printing procedure may proceed to substitute the least depleted CMY colorant for the black colorant to print the user instructions/user designation areas (step 504).

If, however, the least depleted CMY colorant is yellow, the alternative printing procedure may proceed to substitute, for the black colorant, a combination of the least depleted CMY colorant (i.e., the yellow colorant) and the second to least depleted CMY colorant (i.e., the Cyan or the Magenta colorant). The second to least depleted CMY colorant is used in this case to ensure the printed user instructions/user designation areas are readable.

The reader will note that in this example, the alternative printing procedure uses less of the K-colorant 204(a) (as compared to the default printing procedure). As a result, the life of the K-print cartridge 204 is extended. Additionally, it can be seen that the alternative printing procedure makes use of colorant (i.e., the least depleted CMY colorant) from the multi-colorant cartridge that might otherwise not be utilized when the cartridge reaches the end of its life cycle.

It should also be noted that there is a disadvantage to using the alternative printing procedure in that the colors of the user instructions/user designation areas (although readable) are not accurately reproduced. It has been determined (in this example), however, that this trade-off is desirable in view of the advantage of extending the life of the K-print cartridge 204.

Other Document Types

It is to be understood that the printer may apply the printing methods just described to any type of document it prints. For example, the printer 106 of the embodiment just described may print other types of documents that include pre-selected image elements that are eligible for colorant substitution in the same manner as just described.

In some cases, these documents may be generated by the user 110 on the host computer 104 and then transmitted (in the form of a print job) to the printer 106. The printer may print these documents in a similar manner as just described. Accordingly, when the CMY colorants of the multi-colorant cartridge are determined not to be balanced, the printer may substitute the least depleted CMY colorant (and possibly the second to least depleted CMY colorant) for a default colorant when printing the pre-selected image elements of the document.

OTHER EMBODIMENTS

Figure 6:
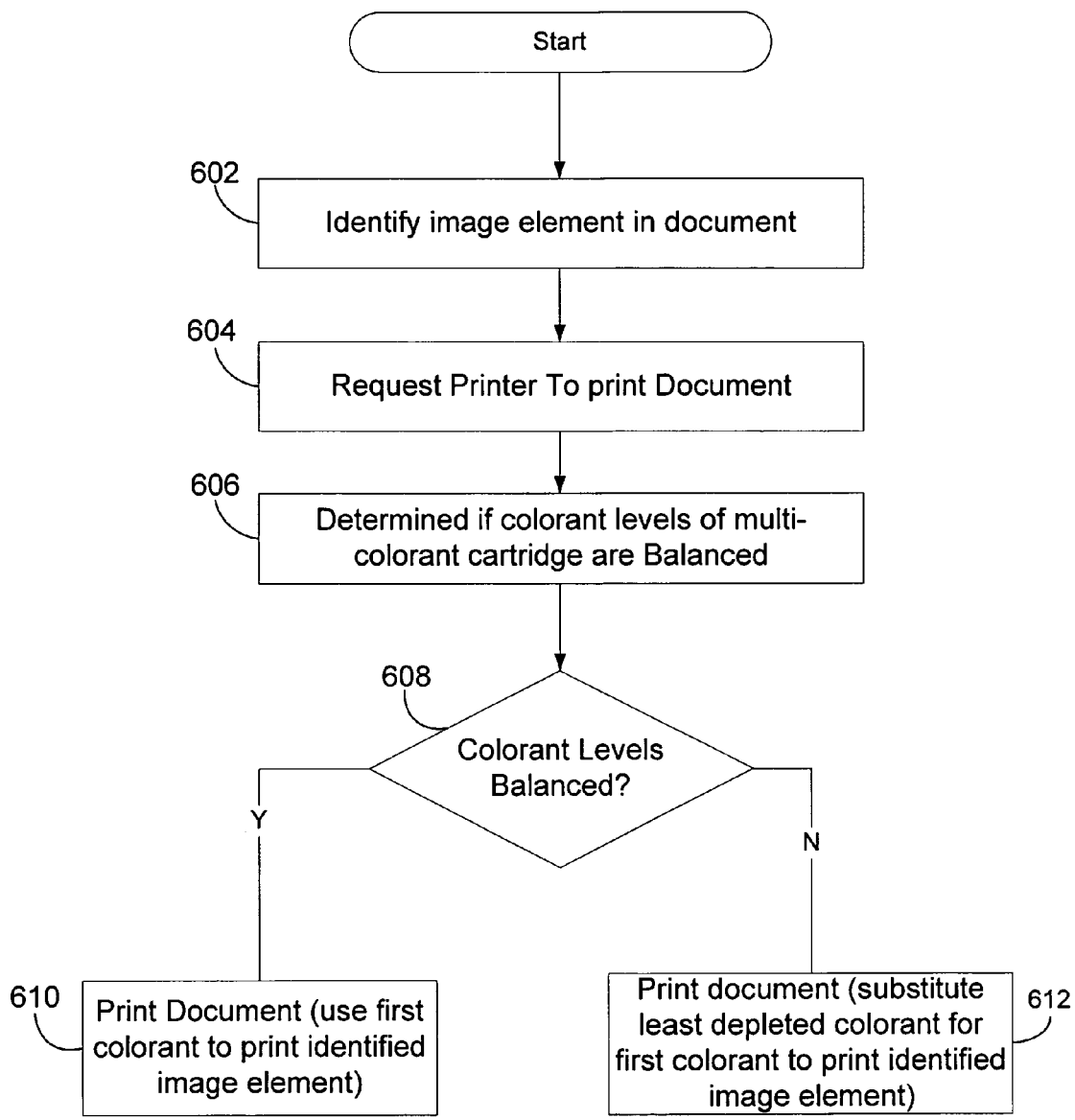
FIG. 6 is a flow diagram illustrating steps in a method according to one embodiment of the invention.

FIG. 6 is a flow diagram illustrating steps in a method according to one embodiment of the invention. With reference to FIG. 6, an image element in a document is identified (step 602). At step 604, a printer is requested to print the document. At step 606, in response to the request, the printer determines if the colorant levels in a multi-colorant cartridge installed in the printer are balanced. This step may be performed using pre-determined criteria If the printer concludes the colorant levels are presently balanced, the printer prints the document using a default printing procedure (step 608, 610). We will assume in this example that the printer uses a first colorant (colorant "A") to print the identified image element. We will further assume that the colorant "A" is not the least depleted colorant in the multi-colorant cartridge. Colorant "A" may be the most depleted colorant in the multi-colorant cartridge, for example.

If the printer concludes the colorant levels are not balanced, the printer prints the document using an alternative printing procedure (step 610, 612). At step 612, the printer substitutes the least depleted colorant in the multi-colorant cartridge for colorant "A" when printing the identified image element in the document.

The present invention may also be embodied in the form of a "computer-readable medium" that stores (either temporarily or permanently) computer executable instructions. For example, an embodiment of the invention includes computer-readable medium for performing the steps depicted in one or more of the flow diagrams described above.

As used herein, the phrase "computer-readable medium" can refer to any medium that can contain, store or propagate computer executable instructions. Thus, in this document, the phrase "computer-readable medium" may refer to (the following is a non-exhaustive list), a magnetic, optical, or semiconductor based storage device. The phrase "computer-readable medium" may also refer to signals that are used to propagate the computer executable instructions over a network or a network system, such as the Public Internet.

Although several specific embodiments of the invention have been described and illustrated, the invention is not to be limited to specific forms or arrangements of parts so described and illustrated. The invention is limited only by the claims and the equivalents thereof.

What is claimed:

1. In a printer that includes a multi-colorant print cartridge, a method of printing a document comprising:
    determining if a level of a most depleted colorant in the multi-colorant cartridge and a level of a least depleted colorant in the multi-colorant cartridge meet predetermined criteria;
    if the criteria are met, then performing a default printing procedure to print the document;
    if the criteria are not met, then performing an alternative printing procedure to print the document; and
    wherein the alternative printing procedure uses more of the least depleted colorant to print the document as compared to the default printing procedure.

2. The method of claim 1, wherein the determining step includes:
    determining that the pre-determined criteria are met if a difference between the most depleted colorant level and the least depleted colorant level is within a pre-determined threshold value.

3. The method of claim 1,
    wherein the alternative printing procedure substitutes the least depleted colorant in the multi-colorant cartridge to print image elements of the document for another colorant that is used by the default printing procedure to print the same image elements of the document.

4. The method of claim 1,
    wherein performing the default printing procedure includes using a first colorant to print certain image elements of the document;
    wherein performing the alternative printing procedure includes using a second colorant, in place of the first colorant, to print the same image elements of the document;
    wherein the second colorant is the least depleted colorant in the multi-colorant cartridge.

5. The method of claim 1,
    wherein performing the default printing procedure includes using a first colorant to print certain image elements of the document;
    wherein performing the alternative printing procedure includes using a second colorant, in place of the first colorant, to print the same image elements of the document;
    wherein the second colorant is the least depleted colorant in the multi-colorant cartridge;
    wherein the first colorant and the least depleted colorant are two different colorants.

6. The method of claim 1,
    wherein performing the default printing procedure includes using a first colorant to print certain image elements of the document;
    wherein performing the alternative printing procedure includes using a second colorant, in place of the first colorant, to print the same image elements of the document;
    wherein the second colorant is the least depleted colorant in the multi-colorant cartridge;
    wherein the first colorant and the least depleted colorant are two different colorants;
    wherein the first colorant is colorant from a second print cartridge installed in the printer.

7. The method of claim 1,
    wherein performing the default printing procedure includes using a black colorant to print certain image elements of the document;
    wherein performing the alternative printing procedure includes using the least depleted colorant, in place of the black colorant, to print the same image elements of the document;
    wherein the black colorant is obtained from a second print cartridge installed in the printer.

8. The method of claim 1,
    wherein performing the default printing procedure includes using the most depleted colorant from the multi-colorant print cartridge to print image elements of the document;
    wherein performing the alternative printing procedure includes using the least depleted colorant, in place of the most depleted colorant, to print the same image elements of the document.

9. The method of claim 1,
    wherein performing the default printing procedure includes using a first colorant in the multi-colorant print cartridge to print pre-selected image elements of the document;
    wherein performing the alternative printing procedure includes using both the least depleted colorant and a second to least depleted colorant in the multi-colorant cartridge, in place of the first colorant, to print the pre-selected image element of the document.

10. The method of claim 1, wherein the colorant is one of ink and toner.

11. In a printer, a method, comprising:
(a) receiving a request to print a document;
(b) comparing a level of a least depleted colorant in a multi-colorant cartridge to a level of a most depleted colorant in the multi-colorant cartridge to determine if the least depleted colorant should be used in place of a second colorant to print pre-selected image elements of the document;
(c) if the comparing step concludes the least depleted colorant should be used in place of the second colorant, then printing the document in part by using the least depleted colorant to print the pre-selected image elements.

12. The method of claim 11, further comprising:
(d) if the comparing step concludes the least depleted colorant should not be used in place of the second colorant, then printing the document in part by using the second colorant to print the pre-selected image elements.

13. The method of claim 11, wherein the least depleted colorant and the second colorant are two different colorants.

14. The method of claim 13, wherein the least depleted colorant and the most depleted colorant are both over 50% of full capacity.

15. The method of claim 11, wherein the multi-colorant cartridge includes a reservoir of cyan colored colorant, a reservoir of magenta colored colorant and a reservoir of yellow colored colorant.

16. The method of claim 11,
wherein the multi-colorant cartridge includes a reservoir of cyan colored colorant, a reservoir of magenta colored colorant and a reservoir of yellow colored colorant;
wherein the colorant is one of the following: toner and ink.

17. A printer that can use a multi-colorant print cartridge, comprising:
(a) means for determining if colorant levels in the multi-colorant print cartridge are balanced;
(b) means for:
(i) directing the printer to print selected elements of a document using a first colorant if the determining means determines the colorant levels are balanced;
(ii) directing the printer to print the same selected elements of the document using a least depleted colorant from the multi-colorant print cartridge, in place of the first colorant, if the determining means determines the colorant levels are not balanced.

18. The printer of claim 17, wherein the first colorant is obtained from a second print cartridge installed in the printer.

19. The printer of claim 17, wherein the first colorant is black.

20. The printer of claim 19, wherein the least depleted colorant is cyan.

21. The printer of claim 17, wherein the first colorant is black the selected elements correspond to text in the document.

22. A printer, comprising:
(a) a multi-colorant cartridge for supplying cyan (C), magenta (M) and yellow (Y) colorant;
(b) a single colorant cartridge for supplying black colorant;
(c) a controller configured, in response to a request to print a document, to:
(i) determine if the CMY colorant levels are balanced;
(ii) if the CMY colorant levels are determined to be balanced, then direct the printer to print the document according to a default printing procedure;
(iii) if the CMY colorant levels are determined not to be balanced, then direct the printer to print the document according to an alternative printing procedure;
wherein the default printing procedure prints a plurality of elements in the document using the black colorant;
wherein the alternative printing procedure substitutes, for the black colorant, cyan colorant to print a subset of the elements if the cyan colorant is a least depleted colorant in the multi-colorant cartridge.

23. The printer of claim 22, wherein the alternative printing procedure substitutes, for the black colorant, a combination of a least depleted colorant and a second to least depleted colorant from the multi-colorant cartridge if the yellow colorant is the least depleted colorant in the multi-colorant cartridge.

24. The printer of claim 23, wherein the alternative printing procedure prints the plurality of elements in the document that are not members of the subset using the black colorant.

25. The printer of claim 22, wherein the printer is an inkjet printer.

26. The printer of claim 22, wherein the printer is a laser printer.

27. A computer-readable medium having computer executable instructions embodied therein to cause a processor of a printer that includes a multi-colorant print cartridge to:
determine if a difference between a level of a most depleted colorant in the multi-colorant print cartridge and a level of a least depleted colorant in the multi-colorant cartridge is below a threshold value;
if the difference is below the threshold value, then direct the printer to print a document according to a default printing procedure;
if the difference is not below the threshold value, then direct the printer to print the same document according to an alternative printing procedure.

28. The computer readable medium of claim 27,
wherein the default printing procedure uses a first colorant to print pre-selected elements of the document;
wherein the alternative printing procedure uses the least depleted colorant from the multi-colorant cartridge, in place of the first colorant, to print the pre-selected elements of the document.

29. The computer readable medium of claim 27,
wherein the default printing procedure uses a first colorant to print pre-selected elements of the document;
wherein the alternative printing procedure uses a combination of the least depleted colorant and a second to least depleted colorant from the multi-colorant print cartridge in place of the first colorant to print the pre-selected elements of the document.

* * * * *